United States Patent [19]

Frank

[11] Patent Number: 4,499,551
[45] Date of Patent: Feb. 12, 1985

[54] RAPID GENERATION OF DISCRETE RANDOM VARIATES FROM GENERAL DISTRIBUTIONS

[75] Inventor: Amalie J. Frank, Chatham Township, Morris County, N.J.

[73] Assignee: AT&T Bell Laboratories, Murray Hill, N.J.

[21] Appl. No.: 423,856

[22] Filed: Sep. 27, 1982

[51] Int. Cl.³ ............................................. G06F 7/38
[52] U.S. Cl. .................................................. 364/717
[58] Field of Search ......................... 364/717; 331/78; 178/22.19

[56] References Cited

U.S. PATENT DOCUMENTS

| | | | |
|---|---|---|---|
| 3,703,727 | 11/1972 | Knowlton | 364/717 |
| 3,984,668 | 10/1976 | Zetterberg et al. | 364/717 |
| 4,121,830 | 10/1978 | Buckley | 364/717 |
| 4,142,240 | 2/1979 | Ward et al. | 364/717 |

OTHER PUBLICATIONS

Mitchell et al., "Table-Lookup Methods for Generating Arbitrary Random Numbers", *IEEE Trans. on Computers*, vol. C-26, No. 10, Oct. 1977, pp. 1006-1008.
*Comm. of the ACM-Jan. 1963-"Generating Discrete Random Variables in a Computer"-G. Marsaglia.
*ACM Trans. on Math. Software-Sep. 1977-"An Efficient Method for Generating Discrete Random Variables with General Distributions"-A. J. Walker.
*As discussed in specification.

*Primary Examiner*—David H. Malzahn
*Attorney, Agent, or Firm*—Joseph P. Kearns; Robert O. Nimtz

[57] ABSTRACT

Method and apparatus for the rapid generation of discrete random variates, of a general probability distribution, from random variates of a uniform distribution uses simple logic and moderate storage requirements. Access to a first table at an address which is a function of a uniform variate gives the desired variate value directly for a large percentage of cases and in the remaining cases the desired variate value is obtained by an indexed search of a second table of cumulative distribution function values. Results of greater precision are realized in faster execution times with less logic complexity and reduced storage bulk as compared with prior methods and apparatus.

8 Claims, 9 Drawing Figures

RAPID GENERATION OF DISCRETE RANDOM VARIATES FROM GENERAL DISTRIBUTIONS

FIELD OF THE INVENTION

This invention relates to apparatus and method for rapid generation of discrete random variates from general distributions.

BACKGROUND OF THE INVENTION

A random variate, which is a sample value of a random or stochastic variable, is a real number derived from a probability distribution. Random variates can be either discrete or continuous depending upon whether the random variable from which they are derived is discrete or continuous. If the number of values a random variable can assume is finite or countably infinite, it is discrete. Discrete random variates find application in conducting simulations, and in optimization processes such as those for determining interconnection configurations and partitioning of logic between several chips in very large scale integrated circuits, and such as those for optimizing computer code, and in generating random signals for masking, encryption, testing, image coding and texture generation, games, computer-aided instruction, artistic patterns and musical composition. Statistical studies, in particular, of arrivals and departures and of probabilities of successes and failures of testing procedures, defect analysis and traffic analysis are based on discrete distributions such as, the Poisson distribution, represented by the following function giving the probability that the random variable assumes the value x:

$$y = f(x) = \frac{\lambda^x}{x!} e^{-\lambda}, \tag{1}$$

where
$x = 0, 1, 2, \ldots,$
$\lambda =$ the mean of the distribution defined as the average of its possible values weighted by their probability of occurrence, i.e., the summation of the products of the function f(x) and its independent variable x, and
e = the exponential value 2.71828+.

The Poisson distribution is used hereinafter in an illustrative embodiment of the invention.

In the prior art several methods for generating variates have been used, such as, the inverse transformation method and the composition method. In the inverse transformation method a uniform random variate, i.e., one taken from a uniform distribution for which all values of the random variable with nonzero probability have equal probability, is mapped or transformed into a random variate from another distribution, e.g., of the Poisson type, by means of the inverse transformation of the cumulative distribution function (CDF). Uniform random variates or more correctly approximations thereto may be obtained by one of several well-known means including computation, operation of a mechanical device, or as the evidence of random physical phenomena. The cumulative distribution function gives for each real number x the probability that the random variable has a value less than or equal to the value x. It is defined for all real numbers, and for a discrete random variable it has a steplike form. As an example, the Poisson distribution given in equation (1) with $\lambda = 2$ takes on the following values, shown to six decimal places:

| | | | |
|---|---|---|---|
| f(0) = | $2^0 e^{-2}/0! =$ | $1/e^2 =$ | 0.135335 |
| f(1) = | $2^1 e^{-2}/1! =$ | $2/e^2 =$ | 0.270670 |
| f(2) = | $2^2 e^{-2}/2! =$ | $2/e^2 =$ | 0.270670 |
| f(3) = | $2^3 e^{-2}/3! =$ | $4/3e^2 =$ | 0.180447 |
| . | | | |

The associated cumulative distribution function, denoted by F(x) is

| | | |
|---|---|---|
| F(x) for x < 0 = | 0 = | 0.000000 |
| F(x) for 0 ≦ x < 1 = | f(0) = | 0.135335 |
| F(x) for 1 ≦ x < 2 = | f(0) + f(1) = | 0.406006 |
| F(x) for 2 ≦ x < 3 = | f(0) + f(1) + f(2) = | 0.676676 |
| F(x) for 3 ≦ x < 4 = | f(0) + f(1) + f(2) + f(3) = | 0.857123 |
| . | | |

If F(x) = y denotes the cumulative distribution function, then its inverse, denoted by $F^{-1}(y) = x$ is obtained by interchanging the dependent and independent variables, giving for the indicated example

| | |
|---|---|
| $F^{-1}(y)$ | for 0 < y ≦ 0.135335 = 0 |
| $F^{-1}(y)$ | for 0.135335 < y ≦ 0.406006 = 1 |
| $F^{-1}(y)$ | for 0.406006 < y ≦ 0.676676 = 2 |
| $F^{-1}(y)$ | for 0.676676 < y ≦ 0.857123 = 3 |
| . | |

Since it denotes cumulative probability, F(x) or y ranges from 0 to 1, and thus the function $F^{-1}(y)$ is defined for y ranging from 0 to 1.

Consider now starting with a random variable U which is uniformly distributed in the range from 0 to 1, and operating upon it with the inverse function $F^{-1}$, that is for each specific value u of the random variable U, obtain the value $F^{-1}(u)$, thus obtaining a new random variable, called U'. Then, according to the laws of probability, the CDF of this new random variable U' is the same as F(x), and the probability distribution of U' is the same as f(x). Accordingly, to generate a random variate from any given probability distribution f(x), first generate a random variate value u and then compute $F^{-1}(u)$. The resulting value is the desired random variate from the distribution f(x). For continuous random variables the equation for the CDF F(x) = y may generally be solved algebraically for x as an explicit function of y, or equivalently as the inverse $x = F^{-1}(y)$. Then the generated uniform random variate u is substituted for each appearance of y in the expression $F^{-1}(y)$, and the resulting value of $F^{-1}(y)$ is the desired random variate, x. In general it is not possible to obtain x as an explicit function of y for discrete random variables which have step-like cumulative distribution functions, and in particular those containing factorial expressions as for the Poisson distribution. Instead, the inverse operation may be performed in effect by comparing the uniform random variate u to the arguments of the inverse cumulative distribution function at its transitional or stepped points. For example, if the value of u is 0.529437 then comparing it to the arguments of the inverse functional values, $F^{-1}$, given above, we see that it falls in the range $0.406006 < y \leq 0.676676$, yielding the inverse functional value of 2, which is the value of the desired random variate x.

It is seen that the arguments of the inverse CDF are embodied in the values of the CDF itself. Accordingly, to make the indicated comparisons, the transitional CDF values must be available in some form. The CDF values, i.e., y, can be computed on demand by repeated use of equation (1) or precalculated and stored in a table. In general, in-line computation of the CDF values is used when the Poisson parameter $\lambda$ is subject to change at each instance of generating a Poisson random variate, or when the number of parameters is large or when storage capacity is limited. Otherwise, the table storage approach is a time saver.

In either the in-line or indicated table approach, the search for the appropriate CDF value may proceed sequentially, as in the above example where the uniform variate of 0.529437 is compared first to 0.135335, then to 0.406006, and finally to 0.676676. However, sequential searching is slow and becomes slower with increasing Poisson parameter values. The sequential search has heretofore been speeded up by index searching, whereby searching of the CDF table does not always start at the beginning of the table, but at some subsequent point which depends upon the value of the uniform variate. In this method an auxiliary table is constructed to contain indices or addresses of various entries in the CDF table at which searching is to start. A simple operation on the uniform variate produces an address which is used to enter the auxiliary table. The value obtained from the auxiliary table is the index into the CDF table, and the uniform variate is compared to the CDF table value at the position indexed. If the uniform variate value is less than or equal to the CDF value, then the desired random variate is the index of the CDF value, possibly offset by a constant. If, on the other hand, the uniform variate exceeds the CDF value, then the search continues in a sequential manner as before.

An alternative table approach, called the direct table method, uses a single table which has a separate entry for each possible uniform random variate value in the range from 0 to 1, but with the uniform random variate values limited to a given number of decimal places. For example, with four decimal places the table contains 10,001 entries for the uniform random variates 0.0000, 0.0001, 0.0002, . . . , 0.9999, 1.0000. A given uniform random variate, shifted and possibly incremented by one, gives the address of the table entry which contains the desired random variate value directly. This method is very fast, but requires expensive storage even for the relatively small precision of four decimal places.

In composition methods, the given probability distribution, such as the Poisson, is replaced by a set of component distributions, each of which has a weight with the several weights summing to one. To obtain the desired random variate, one of the component distributions is chosen with probability equal to its weight, and then a value is randomly selected according to the component distribution.

Composition methods avoid the searching, but require much preliminary computation in decomposing the overall distribution into components. One embodiment of the composition method, known as Marsaglia's method has relatively large storage and low precision. See in this connection the paper by G. Marsaglia entitled "Generating Discrete Random Variables in a Computer" (*Communications of the ACM*, Vol. 6, No. 1, January 1963, pp. 37–38). A second embodiment of the composition method, known as Walker's method, has low storage, but requires generation of two uniform random variates. See in this connection the paper by A. J. Walker entitled "An Efficient Method for Generating Discrete Random Variables with General Distributions" (*ACM Transactions on Mathematical Software*, Vol. 3, No. 3, September 1977, pp. 253–256).

It is an object of this invention to improve the generation of discrete random variates from a general distribution over known methods and depending upon the particular known method the improvement is made in one or several of the aspects of timing, storage requirements, logic complexity and precision.

It is another object of this invention to generate Poisson random variates from a uniform general distribution over a wide range of parameter values.

SUMMARY OF THE INVENTION

According to this invention, discrete random variates, illustratively of the Poisson distribution, are generated rapidly and expeditiously by an inverse-transformation method which combines indexed searching and direct access to variate values arranged in the order of a cumulative distribution function (CDF).

Practical apparatus for the random variate generator of this invention comprises a pseudorandom number (PSN) generator triggered by a start signal for obtaining uniform random variates (U) to a given level of precision, a circuit for operating upon U to obtain an address into a first random access memory (RAM), the said first random access memory storing random variate values of the desired probability distribution in preselected entries, and storing addresses to a second random access memory in the remaining entries, the said second random access memory storing cumulative distribution function values, first and second addressing circuits for the respective RAMS, a first coincidence gate for releasing a final variate value for preselected U values; a comparator for matching successive CDF and U values other than the preselected U values, a second coincidence gate for releasing a final variate value for U values exceeding a compared CDF value, and an offset register for truncated initial CDF values.

The method comprises the steps of triggering the uniform PSN generator, forming an address from the PSN value, addressing the first RAM with that address to select a value and a code bit indicating whether or not the selected value is a variate value or is an address into a second RAM, delivering that value to an output location when the code bit indicates that it is a variate, addressing the second RAM with the selected value when the code bit indicates the value is an address, comparing the CDF value in the second RAM with the PSN value, delivering the address of the CDF value (possibly offset by a constant) to an output location when the PSN value is less than or equal to the CDF value, calling up the next higher CDF value from the second RAM when the PSN value is greater than the initial CDF value, comparing the next CDF value with the PSN value and delivering the address corresponding to that CDF value (possibly offset by a constant) to an output location when the PSN value is less than or equal to that CDF value, and finally repeating the comparisons of succeeding CDF values stored in the second RAM with the PSN value until the CDF value first exceeding the PSN value is found and delivering the address corresponding to that CDF value last compared (possibly offset by a constant) to an output location.

BRIEF DESCRIPTION OF THE DRAWING

This invention will be better understood from the following detailed description and the drawing in which.

DETAILED DESCRIPTION

Figure 1:
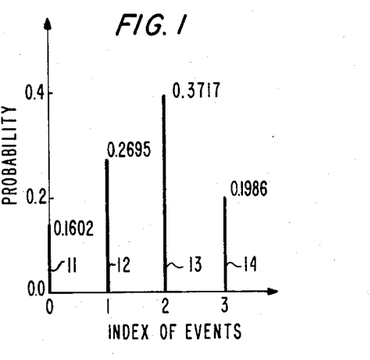
FIGS. 1, 2, 3 and 4 are diagrams of a representative discrete probability distribution, the equivalent direct and inverse cumulative distribution functions derived therefrom and the relationship between a uniform random variate and the corresponding discrete random variate, respectively.
Figure 2:
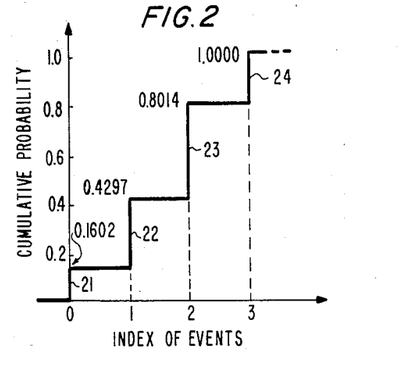
Figure 3:
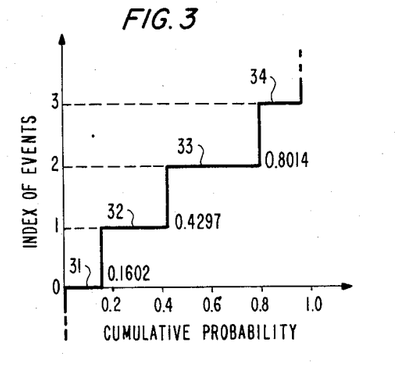

FIGS. 1, 2 and 3 provide an introduction to the concept of random variate generation by way of an elementary example. Specifically, FIG. 1 represents an arbitrary discrete probability distribution for a series of four mutually exclusive random events, labeled 0, 1, 2, and 3. These probabilities can be set down as shown in TABLE I.

TABLE I

| Event k | Probability |
|---|---|
| 0 | 0.1602 |
| 1 | 0.2695 |
| 2 | 0.3717 |
| 3 | 0.1986 |
| Total | 1.0000 |

The relative height of vertical bars 11, 12, 13 and 14 in FIG. 1 corresponds to the tabulated values. It may be noted that the probabilities sum to unity. This indicates that one of the four events must occur at each trial.

FIG. 2 represents the cumulative probability distribution function (CDF) derived from the probability distribution by summation of the individual probabilities according to TABLE II.

TABLE II

| Range of k | CDF Probability for Any Value in Indicated Range |
|---|---|
| $0 \leq k < 1$ | 0.1602 |
| $1 \leq k < 2$ | 0.4297 |
| $2 \leq k < 3$ | 0.8014 |
| $3 \leq k < 4$ | 1.0000 |

The relative heights of the steps in FIG. 2 correspond to the values of TABLE II. The first tabular entry in TABLE II is identical to the first in TABLE I and indicates the probability of occurrence of event 0 only. The succeeding entries correspond to the respective combined probabilities of occurrence of events 0 or 1; and 0, 1 or 2; and 0, 1, 2 or 3. The last tabular entry indicates that the occurrence of at least one of the events is a certainty.

Figure 4:
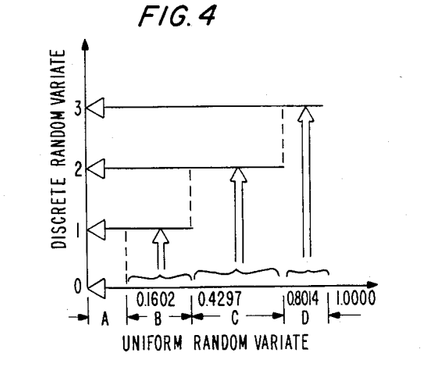

FIG. 3 is the inverse of the CDF of FIG. 2, i.e., the horizontal and vertical axes are interchanged. The CDF values become the independent variable and the index of events becomes the dependent variable. Bold horizontal lines 31, 32, 33, and 34, respectively, in FIG. 3 correspond to bold vertical lines 21, 22, 23, and 24, respectively, in FIG. 2. FIG. 4 in essence repeats the inverse CDF of FIG. 3 and explicitly indicates the inverse transformation or mapping of the uniform random variate values into the desired random variate values, as previously discussed. The range of the uniform variates from 0 to 1 is divided into four segments labeled A, B, C, and D. All points in segment A map into the random variate value 0. All points in segment B map into the random variate value 1. Similarly, all points in segments C and D, respectively, map into values 2 and 3, respectively.

Figure 5:
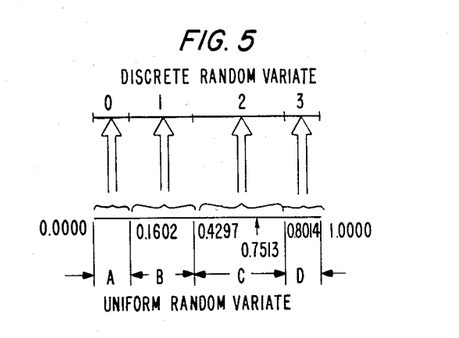
FIGS. 5 and 6 are respectively a linear and a polar representation of the inverse cumulative probability distribution function of FIG. 3 useful in explaining the concept of this invention.

FIG. 5 is a two-line variation of FIG. 3 in which the lower line is the same as the horizontal axis of FIGS. 3 and 4 and the upper line matches the vertical axis of FIG. 4. It shows in simpler form the mapping of the uniform random variate segments A, B, C, and D into the random variate values 0, 1, 2, and 3. As an example the uniform random variate 0.7513 shown in FIG. 5 maps into the desired random variate value 2.

Figure 6:
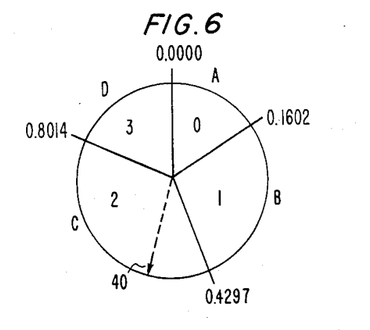

FIG. 6 is a polar diagram of FIG. 3 whose horizontal axis is wrapped into a circle and the transition between sectors 0, 1, 2 and 3 are radii. FIG. 6 further shows broken-line arrow 40 representing a spinner pivoted at the center of the circle in the manner of a wheel of fortune. The concept of determining a random variate from a uniform random variate is here apparent. Every operation of the spinner results in a final spinner position which occurs with equal probability any place on the circle, and thus models the selection of a uniform random variate. The desired random variate is the number of the sector within which the spinner comes to rest, and the probability of occurrence of each random variate value is seen to be related to the width of the sectors. In essence the method of generating the discrete random variate is first to generate the uniform random variate lying in the range of 0 to 1 and map it into the discrete random variate with the selected probability distribution.

In this example k has only four values. In a more realistic example k may be very large or infinite, but for implementation purposes values are truncated at the upper end of the distribution, and possibly also at the lower end of the distribution.

In the direct method of implementing the inverse transformation of CDF values the uniform probability is divided into N equal parts and a direct table is formed with (N+1) entries with addresses ranging from 0 to N. The address of an entry in the direct table is taken to correspond to a uniform random variate value and in particular to the value obtained by dividing the address by N, and the entry made in the table at the indicated address is the output random variate corresponding to the said uniform variate value. For example, using the CDF values of TABLE II and N equal to 100, the addresses 00-16 correspond to uniform variate values 0.00-0.16, all of which map into the output random variate value of 0, resulting in the value 0 at all the direct table entries with addresses 00-16. The entire direct table for this example is shown in TABLE III below. This table is based on the probability distribution shown in TABLE I, which assumes a small number of events. When the number of events is large or infinite, the distribution may be truncated at the upper end and in this case the final output variate in the table may be set to an appropriate large value.

TABLE III

| Address | Output Variate |
| --- | --- |
| 00 | 0 |
| 01 | 0 |
| . | . |
| . | . |
| . | . |
| 16 | 0 |
| 17 | 1 |
| . | . |
| . | . |
| . | . |
| 42 | 1 |
| 43 | 2 |
| . | . |
| . | . |
| . | . |
| 80 | 2 |
| 81 | 3 |
| . | . |
| . | . |
| . | . |
| 100 | 3 |

In this method the uniform variate used to map into an output random variate may assume only N+1 values. In the example given with N equal to 100, this results in only two digits of precision for the uniform random variate. Given such a uniform variate the method proceeds by first multiplying the uniform variate by N and truncating any remaining fractional part, or using equivalent operations such as shifting where applicable to obtain a table address, and then the desired output variate is accessed directly. For example, a uniform variate of 0.34 gives an address of 34 for which the output variate is found to be 1, since 34 lies between 17 and 42 the bounds of zone 1. Greater precision can be achieved by increasing the table size for example to 1001 for three digits of precision or to 10,001 for four digits of precision, or longer. The storage space is, of course, increased correspondingly, and it may be noted that for many applications four digits of precision is insufficient.

Another method of implementing the inverse transformation of CDF values is the sequential search. In this method the storage space is vastly reduced over the direct method. Only the transitional CDF values, i.e., those marking the bounds between output variate zones, need be stored. The transitional values are the same as those in TABLE II and have table addresses respectively of 0. 1, 2 and 3. For a given uniform variate, such as 0.7513, take the lowest CDF(0) transitional value of 0.1602 and compare the uniform variate with the transitional value. Since the given value exceeds CDF(0), the search is continued with the next value CDF(1)=0.4297. Had the uniform variate been smaller than or equal to CDF(0), the correct output variate would have been 0. On the comparison with CDF(1), it is again found that the uniform variate exceeds the transitional CDF value. The search is thus continued further with the next transitional value CDF(2)=0.8014, which value exceeds the uniform variate. Therefore, the correct output variate is 2. The sequential search thus requires a succession of an equal number of accesses of transitional CDF values and comparisons therewith until reaching the first CDF value which is equal to or greater than the uniform variate. It should be noted that setting the final CDF table value to 1 insures proper termination of the successive comparisons since U is always less than or equal to 1. This method is slower than the direct method. However, the storage requirement is lower. The CDF values in TABLE II are shown to four decimal places; in implementation precision for this method is determined only by the size of the elements storing the CDF values and by the size of the comparison register. Precision may easily be increased with little storage penalty.

Yet another known method of implementing the inverse transformation of CDF values is the indexed search. In this method the CDF storage is the same as in the sequential method but an auxiliary table is used to speed the searching process. The resolution time, however, is faster than in the sequential method.

The auxiliary table is formed in a manner somewhat similar to that used in forming the direct table. In the direct table an address of a table entry corresponds to a single uniform variate value, and it is the singleness of this correspondence that limits the precision of the method. In the auxiliary table, an entry corresponds to a range of uniform variate values, such that a uniform variate U maps into that auxiliary table address obtained by multiplying U by N and discarding any fractional part, where N+1 is again the number of auxiliary table values. The following TABLE IV illustrates the index search method for the CDF shown in TABLE II.

TABLE IV

| Range of Uniform Random Variate U | Auxiliary Table | | CDF Table | |
| --- | --- | --- | --- | --- |
| | Address | Value | Address | Value |
| 0.00 ≦ U < 0.01 | 00 | 0 | | |
| 0.0.1 ≦ U < 0.02 | 01 | 0 | | |
| . | . | . | | |
| . | . | . | 0 | 0.1602 |
| . | . | . | | |
| 0.16 ≦ U < 0.17 | 16 | 0 | | |
| 0.17 ≦ U < 0.18 | 17 | 1 | | |
| . | . | . | | |
| . | . | . | 1 | 0.4297 |
| . | . | . | | |
| 0.42 ≦ U < 0.43 | 42 | 1 | | |
| 0.43 ≦ U < 0.44 | 43 | 2 | | |
| . | . | . | | |
| . | . | . | 2 | 0.8014 |
| . | . | . | | |
| 0.80 ≦ U < 0.81 | 80 | 2 | | |
| 0.81 ≦ U < 0.82 | 81 | 3 | | |
| . | . | . | | |
| . | . | . | 3 | 1.0000 |
| . | . | . | | |
| 0.99 ≦ U < 1.00 | 99 | 3 | | |
| 1.00 = U | 100 | 3 | | |

Each auxiliary table entry is the index or address of the first CDF table entry that is equal to or greater than the smallest uniform variate value in the range of such values corresponding to the auxiliary table entry. For example, the auxiliary table entry with address 43 has a value of 2 because CDF(2)=0.8014 is the first CDF table entry which is equal to or greater than 0.43, which is the smallest value in the corresponding random variate value range 0.43≦U<0.44. For this example an alternating way of obtaining each auxiliary table value is to use the address itself rather than the uniform variate values corresponding to the address, by identifying the first CDF table entry with leading digits equal to or greater than the corresponding auxiliary table address. This may be done where N is an integer power of the base of the number representation used, as is the case in TABLE IV where the N of 100 is an integer power of 10, the base of the decimal numbers used in the example.

A case in which this is not applicable is shown in the following TABLE V which has the same CDF as in TABLE IV, but where N is 20.

TABLE V

| Range of Uniform Random Variate U | Auxiliary Table | | CDF Table | |
|---|---|---|---|---|
| | Address | Value | Address | Value |
| 0.00 ≦ U < 0.05 | 0 | 0 | | |
| 0.05 ≦ U < 0.10 | 1 | 0 | 0 | 0.1602 |
| 0.10 ≦ U < 0.15 | 2 | 0 | | |
| 0.15 ≦ U < 0.20 | 3 | 0 | | |
| 0.20 ≦ U < 0.25 | 4 | 1 | | |
| 0.25 ≦ U < 0.30 | 5 | 1 | | |
| 0.30 ≦ U < 0.35 | 6 | 1 | 1 | 0.4297 |
| 0.35 ≦ U < 0.40 | 7 | 1 | | |
| 0.40 ≦ U < 0.45 | 8 | 1 | | |
| 0.45 ≦ U < 0.50 | 9 | 2 | | |
| 0.50 ≦ U < 0.55 | 10 | 2 | | |
| 0.55 ≦ U < 0.60 | 11 | 2 | | |
| 0.60 ≦ U < 0.65 | 12 | 2 | 2 | 0.8014 |
| 0.65 ≦ U < 0.70 | 13 | 2 | | |
| 0.70 ≦ U < 0.75 | 14 | 2 | | |
| 0.75 ≦ U < 0.80 | 15 | 2 | | |
| 0.80 ≦ U < 0.85 | 16 | 2 | | |
| 0.85 ≦ U < 0.90 | 17 | 3 | 3 | 1.0000 |
| 0.90 ≦ U < 0.95 | 18 | 3 | | |
| 0.95 ≦ U < 1.00 | 19 | 3 | | |
| 1.00 = U | 20 | 3 | | |

In practice the indexed search method proceeds as follows. Given a uniform variate U, the corresponding value V is obtained by multiplying U by N and discarding any remaining fractional part. In the case that N is an integer power of the base of the number representation used in the implementation, the indicated multiplication and truncation may be replaced by simpler shifting operations. Then the auxiliary table is accessed at address V to obtain the index or address in the CDF table at which searching starts. For example, using TABLE IV, the uniform variate U=0.5572 gives a value of V=55. The auxiliary table at address 55 is accessed, giving the value 2. Then the value of U of 0.5572 is compared to CDF(2) which is 0.8014. Since U is less than CDF(2) the output random variate is equal to the address, 2, of the compared CDF table entry. In this case the output variate was obtained with two table accesses, one each for the auxiliary and CDF tables, and one comparison.

Additional table accesses and comparisons may be required if a given uniform variate U yields a value V which is the same as the leading portion of a value in the CDF table. For example, the uniform variate U=0.8015 gives V=80, which again leads in TABLE IV to comparison with CDF(2), which equals 0.8014. Since U exceeds CDF(2), the search continues by comparing U to CDF(3) with value 1.0000, and since U does not exceed CDF(3), the output random variate is equal to the address, 3, of the last compared CDF value. This case requires three table accesses and two comparisons. Not all cases for which the uniform variate U yields a value V which is the same as the leading portion of a CDF table value require three table accesses and two comparisons. Thus, the uniform variate U=0.8013 again gives V=80, but U is less tha CDF(2) with value 0.8014, and searching stops after only two accesses and one comparison. Also, more than three table accesses and two comparisons may be required in the case that there are several CDF table entries with identical indicated leading portions. This is illustrated in TABLE VI, which shows the CDF table of TABLE IV expanded with the additional values 0.8045, 0.8073, and 0.8098.

TABLE VI

| Auxiliary Table | | CDF Table | |
|---|---|---|---|
| Address | Value | Address | Value |
| 01 | 0 | 0 | 0.1602 |
| . | . | | |
| . | . | | |
| 16 | 0 | | |
| 17 | 1 | | |
| . | . | | |
| . | . | 1 | 0.4297 |
| . | . | | |
| 42 | 1 | | |
| 43 | 2 | | |
| . | . | 2 | 0.8014 |
| . | . | 3 | 0.8045 |
| . | . | 4 | 0.8073 |
| 80 | 2 | 5 | 0.8098 |
| 81 | 6 | | |
| . | . | | |
| . | . | 6 | 1.0000 |
| . | . | | |
| 100 | 6 | | |

In this case the uniform variate U=0.8097 results in five table accesses, and four comparisons specifically to the CDF table entries 0.8014, 0.8045, 0.8073, and 0.8098. Note also that the auxiliary table entries at addresses 81 through 100 now have value 6, instead of the value 3 as in TABLE IV. The average number of CDF table accesses can be decreased by increasing the auxiliary table size. Using the CDF table of TABLE VI, if N is changed to 1000, thereby increasing the auxiliary table size to 1001, then the uniform variate U=0.8097, when multiplied by 1000 and truncated, yields V=809. At address 809 of the new auxiliary table is stored the value 5, resulting in immediate access of CDF(5) with value 0.8098, and the end of searching after only two table accesses and one comparison, whereas with N=100 five table accesses and four comparisons are required as indicated above.

It should be noted that if an initial portion of the CDF table has been truncated to reduce storage, then the values in the auxiliary table must be offset or reduced by the number of initial CDF table values truncated, and the output random variate is taken as the address of the last CDF table entry compared, offset by the number of initial CDF table values truncated. If the CDF table contains no entries with the same indicated initial portions, and also has no initial values truncated, then the auxiliary table is exactly the same as the direct table, as is the case for TABLE IV. Also note that the indexed search method, unlike the direct method is not limited in the precision of the uniform random variate by the size of the auxiliary table. In the particular examples of TABLES IV and VI, it is seen that while only two of the digits of the uniform variate are used to obtain the auxiliary table address, that all four digits are used in comparing the uniform variate with CDF table entries. Precision can be increased with little storage penalty by increasing the size of the elements used to store CDF table values and the size of the comparison register.

In observing TABLE IV or TABLE VI, one may note that all of the auxiliary table entries at addresses in the range 17-42 have a value of 1, and thus any uniform random variate with initial digits in this range is first compared to CDF(1)=0.4297. A uniform variate U with initial digits 42 when compared to 0.4297 may result either in U not greater than 0.4297 and in setting of the output variate to the value 1, or it may result in U greater than 0.4297, and continuation of searching. However, any uniform variate U with initial digits in the range 17–41 will always result in U not greater than 0.4297 and in setting of the output variate to 1. This is in fact known a priori, and there is actually no need to perform the indicated comparison. Since output variate is known in these cases at the point of accessing the auxiliary table, the output variate may be stored directly in the auxiliary table, along with an indication that such stored value is the output variate value and not an address into the CDF table.

According to this invention, the indexed search method is improved by storing two types of entries in the auxiliary table, whereby one type is as in the indexed search method the address of the CDF table entry at which searching is to begin, and the other type is as in the direct method the desired output random variate. Each auxiliary table entry corresponds to a range of uniform variate values defined as previously indicated for the index search method. For a given auxiliary table entry, if the corresponding range of uniform variates includes any CDF table value, then the auxiliary table value is set to the address of the first CDF table entry that is equal to or greater than the smallest uniform variate value in said corresponding range of uniform variate values. Otherwise it is set to the desired output variate value. To distinguish between the two types of values, a one-bit code or flag is provided for each auxiliary table entry. The following TABLE VII illustrates the improved method where the code for each table entry is signified by the absence or presence of a minus sign, indicating respectively that the entry is a variate value or an address. As indicated previously for the direct method, where the distribution is truncated at the upper end, the final variate value in the auxiliary table may be set to an appropriate large value.

TABLE VII

| Auxiliary Table | | CDF Table | |
|---|---|---|---|
| Address | Value | Address | Value |
| 00 | 0 | | |
| 01 | 0 | | |
| . | . | | |
| . | . | | |
| . | . | | |
| 15 | 0 | | |
| 16 | −0 | 0 | 0.1602 |
| 17 | 1 | | |
| . | . | | |
| . | . | | |
| . | . | | |
| 41 | 1 | | |
| 42 | −1 | 1 | 0.4297 |
| 43 | 2 | | |
| . | . | | |
| . | . | | |
| . | . | | |
| 79 | 2 | | |
| 80 | −2 | 2 | 0.8014 |
| 81 | 3 | | |
| . | . | | |
| . | . | | |
| . | . | | |
| 99 | 3 | 3 | 1.0000 |
| 100 | 3 | | |

TABLE VII is constructed in the same way as TABLE IV and is based on the same Poisson parameters. The difference is in flagging the auxiliary table entries at addresses 16, 42, and 80 with the minus sign. When an auxiliary address other than these values is given, the output variate is obtained directly from the auxiliary table without the necessity of accessing CDF table values and comparing the uniform variate therewith.

In the prior indexed search method it was necessary to look up the next CDF value and make a comparison. In the improved method a comparison is needed only when the address corresponds to a flagged or negative value. Then with the negative sign removed the value is as before an index into the CDF table at which searching is to start, and subsequent operation proceeds exactly as in the prior indexed search method. Since only 3 out of the 100 values 00-99 are flagged, and since the 100 values are uniformly chosen, then for this example the output variate is obtained from the auxiliary table an expected 97% of the time. This percentage may be increased by increasing N. Thus, for N=1000, only 3 values out of the 1000 values 000-999 are flagged, resulting in the output variate obtained from the auxiliary table an expected 99.7% of the time.

Figure 7:
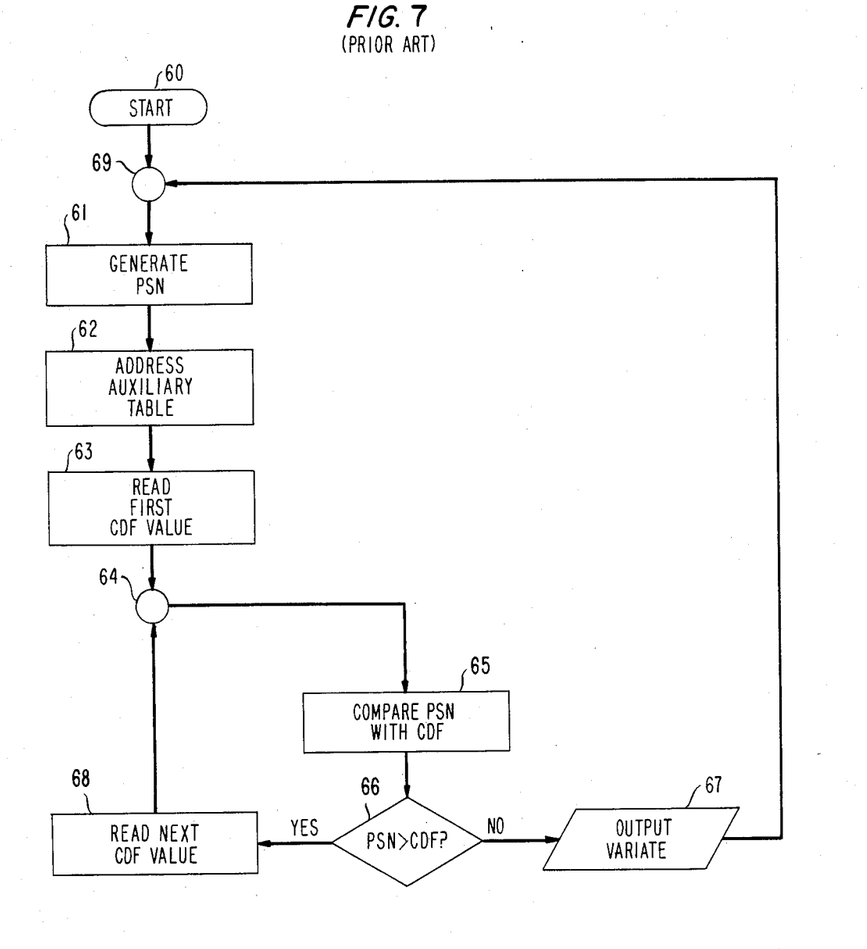
FIG. 7 is a flowchart of an indexed searching method for generating random variates known to the prior art.

FIG. 7 is a flowchart representing the indexed search method known to the prior art. At the start (block 60) a first uniform variate in the range from 0 to 1, designated PSN for Pseudorandom Number is generated at block 61. This PSN is converted into an integral address for the auxiliary table and the auxiliary table is read at this address, thereby obtaining an index into the CDF table in block 62. The indexed CDF value is read in block 63. This transmitted CDF value is passed through connector 64 to block 65. The PSN and CDF values are compared in block 65 and the results of the comparison are tested in decision triangle 66. When the PSN value is smaller than or equal to the CDF value (negative decision in diamond 66), the output variate of block 67 is that corresponding to the CDF value. When the PSN value is greater than the CDF value (positive decision in diamond 66) then by way of connector 68 another PSN is generated and the just described events are repeated to obtain a sequence of output random variates. With each output variate at least one comparison with a CDF value is necessary. It should be noted that no specific test for the final CDF value of 1 is required because no PSN is greater than 1.

Figure 8:
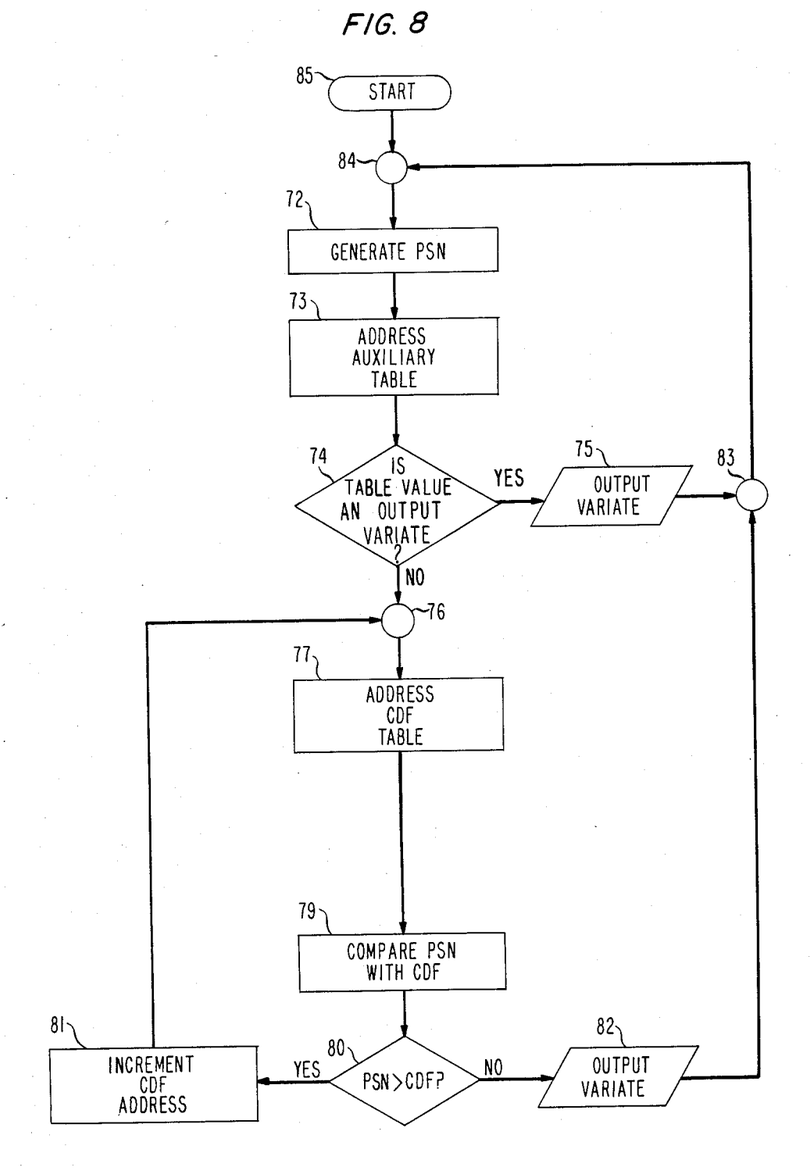
FIG. 8 is a flowchart of a method generating random variates according to this invention.

FIG. 8 is a flowchart representing the improved indexed searching method of this invention. At the start (block 85) a PSN number in the range from 0 to 1 is generated according to block 72 and an auxiliary table address is constructed and the auxiliary table is read at this address according to block 73. The test of decision diamond 74 is applied to the one-bit code to determine the type of table entry. When the code is unflagged, the output variate is obtained directly from the auxiliary table as indicated by block 75. By way of connectors 83 and 84 the next PSN number is randomly selected. This occurs in the great majority of cases. When the address is flagged, illustratively by the minus sign, only then does it become necessary to consult the CDF table by way of connector 76 and block 77. The PSN is compared with the corresponding transitional CDF value, as directed by block 79. The comparison test of block 80 determines whether the desired variate can be output immediately in accordance with block 82, when PSN does not exceed the transitional CDF value, or whether the search for a higher CDF value must continue by way of block 81, which directs the incrementation of the CDF address to the next higher transitional value. When the next higher CDF value does not exceed the PSN value, the search is continued as in the prior indexed search method.

The improved search method of this invention, although requiring the same storage capacity for a given probability distribution obtains results with a single table access and no comparison in most cases. A second access into the CDF table is required only where the address in the auxiliary table is flagged. Continued searches are required only when the PSN value exceeds the initially addressed CDF value.

Figure 9:
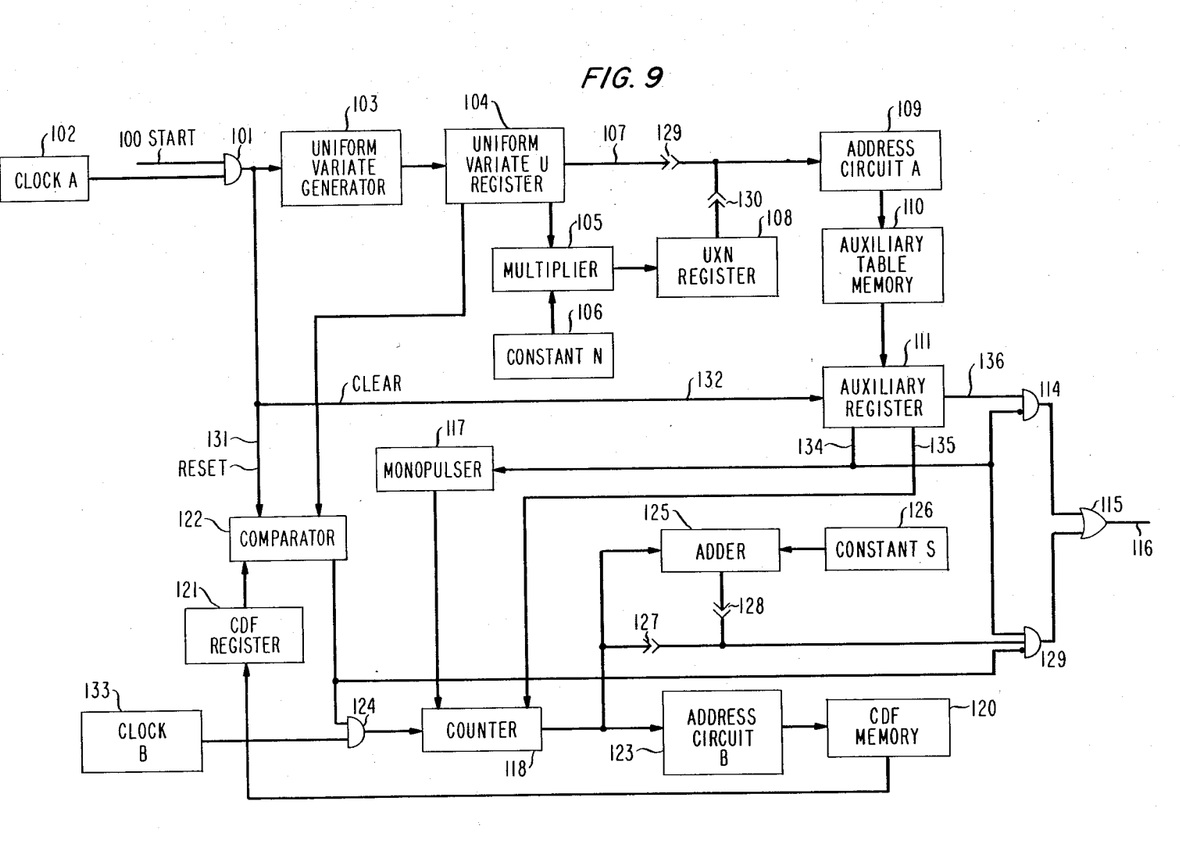
FIG. 9 is a block diagram of an arrangement for generating random variates according to this invention.

FIG. 9 is a block diagram of digital apparatus for generating random variates according to the method of this invention. It is assumed that the tables for auxiliary memory 110 and CDF memory 120 are precalculated and loaded therein. Memories 110 and 120 are random access memories of a well known kind. Uniform variate generator 103 is also of a well known form comprising, for example, a cascade of bistable registers connected together by modulo-two adders. See in this connection the paper by A. R. Pratt entitled "Fast Pseudo-number Generators for Computers" (*The Radio and Electronic Engineer,* Vol. 40, No. 2, August 1970, pp. 83–88).

The digital apparatus of FIG. 9 comprises uniform variate generator 103 timed by clock 102 through AND-gate 101, uniform variate register 104, optional multiplier 105 driven by constant N store 106 and product register 108, address circuit 109, auxiliary table memory 110, auxiliary register 111, monopulser 117, counter 118, optional adder 125 and constant S store 126, CDF memory 120, CDF register 121, comparator 122, address circuit 123, AND gates 114 and 129, OR-gate 115, clock 133 and AND-gate 124. Upon the application of a start pulse on lead 100, AND-gate 101 is enabled to supply clock pulses from clock A(102) to uniform variate generator 103, which outputs a multi-digit random number having as many places as there are bistable stages in generator 103. This number is transferred in parallel to uniform variate register 104, where it is stored for future use in comparator 122. The uniform variate has a maximum value of unity.

The uniform variate is next converted to an address for accessing the auxiliary table. If N, the size of the auxiliary table less one, is an integer power of the base of the number representation of register 104, the conversion is accomplished by tapping a specified number of the high-order digits of register 104 onto signal path 107 and through patch 129 to address circuit A(109). This is done, for example, if register 104 is a decimal register and N is 100 or $10^2$, thus requiring the two high order decimal digits of register 104 to be tapped, or as a second example, if 104 is a binary register and N is 128 or $2^7$, thus requiring the seven high order binary digits of register 104 to be tapped. If N is not an integer power of the number base of register 104, then the conversion is performed by multiplier 105 which multiplies the entire uniform random variate in register 104 by the value N stored in register 106, and supplies the product to register 108. A specified number of high order digits of register 108 are then applied as an alternative to address circuit 109 through patch 130 instead of the indicated high order digits of the source uniform variate.

Auxiliary table memory 110 is illustratively a conventional RAM preloaded with consecutive digits starting with address 0 in a format such as TABLE VII. Each memory location contains a binary code or flag bit, represented in TABLE VII by the absence or presence of a minus sign, and a random variate value, if the code bit is 0, and an address into the CDF memory if the code bit is 1. Address circuit 109 causes the contents at the addressed location in auxiliary table memory 110 to be transferred to auxiliary register 111 where two outputs are made available on leads 134 and 135. The output on lead 134 is the code bit, 0 to 1, depending upon whether the associated value is the valid output variate or a comparison with a transitional CDF value is required. In the former instance the output random variate is delivered on lead 136 through AND-gate 114 and OR-gate 115 to a utilization circuit (not shown) at lead 116. At the same time the code bit of value 0 at output 134 inhibits AND gate 129 and when inverted enables AND gate 114.

On the other hand, where the code bit is 1, the associated value is the address of a transitional CDF table entry and an indexed search begins. To perform the indexed search the code bit on lead 134 inhibits AND-gate 114 and triggers monopulser 117 to cause the CDF address on lead 135 to be loaded into counter 118 for further transfer to address circuit B(123). In turn CDF memory 120 is thereby accessed and the value stored at the accessed location is transferred to CDF register 121. Comparator 122 has as one of its inputs the uniform variate stored in register 104 and the transitional CDF value now stored in CDF register 121. If the uniform variate is less than or equal to the CDF value, the output is 0; and 1 otherwise. In the former case the search terminates and the output variate held in counter 118 is applied through patch 127 and AND-gate 129, now enabled by the 1 signal from lead 134 and the inverted 0 signal from comparator 122, to OR gate 115 and a utilization circuit on lead 116. In the latter case the search continues when the inverted 1 output (indicating failure of comparison) of comparator 122 inhibits AND-gate 129 but enables AND-gate 124. A clock pulse from clock B(133) passes through AND-gate 124 to increment counter 118, when through the agency of address circuit 123 the next high CDF transitional value in CDF memory 120 is read into CDF register 121. The new CDF value is compared in comparator 122 with the uniform variate value from register 104. The loop of elements 122, 124, 118, 123, 120 and 121 continues in operation until there is reached a CDF value which the uniform value exceeds. Then the 0 output of comparator 122 enables AND-gate 129 to pass the output of counter 118 through patch 127 and thence to OR-gate 115 and output lead 116 as a valid output variate.

Due to the nature of certain probability functions where the initial CDF values encompass a relatively narrow range it may be acceptable to truncate such values in order to reduce storage. A minimum output variate can be selected by inserting offset adder 125 in the circuit between counter 118 and AND-gate 129. The numerical value of the chosen offset which is equal to the number of truncated values is stored in constant S block 126 and the output of counter 118 is incremented by this constant value in adder 125. In this event patch 128 is cut through and patch 127 is opened between counter 118 and AND-gate 129. The output variate is thus the sum of the contents of counter 118 and constant store 126.

At the time of the next start pulse on line 100 for the purpose of generating the next variate a clock pulse from clock source 102 is also applied to line 131 to reset comparator 122 to an initial zero state and to line 132 to clear auxiliary register 111.

The method and apparatus of this invention generate discrete random variates conforming to a preselected probability distribution from a uniform distribution in an efficient, speedy and reliable manner. The Poisson probability distribution is discussed in the illustrative embodiment. In comparison with prior such methods, the primary advantage is that execution time is reduced, and depending on the particular prior method less storage capacity is required, the logic is less complex both with regard to table construction and in execution, and there is greater precision.

The scope of this invention is to be judged by the appended claims.

What is claimed is:

1. A generator of discrete random variates comprising
    a source of random numbers suppliable on demand from a uniformly distributed number set for use in generating addresses;
    a first random access memory storing mappings of said addresses into a set of numerical values corresponding to a preselected discrete probability distribution, each numerical value covering a range of addresses, and coded addresses corresponding to transitional values in said probability distribution;
    a second random access memory storing transitional values only of a cumulative distribution function derived from said probability distribution;
    means responsive to the address corresponding to a selected random number from said source for accessing said first memory to retrieve a random variate directly, and for accessing said second memory using said coded address; and
    means responsive to a coded address corresponding to a selected random number from said source for comparing said selected random number with successive cumulative distribution function values from said second memory in increasing order until the cumulative distribution function value next higher than said random number is determined, the random variate corresponding to such next highest value being the valid output random variate.

2. The generator of random variates defined in claim 1 in which said first and second random access memories are preprogrammed according to said preselected probability distribution.

3. The generator of random variates defined in claim 2 in which said first and second random access memories are preprogrammed according to the Poisson probability distribution function of the form $$P = \frac{e^{-\lambda}(\lambda)^n}{n!},$$

where
    P = Poisson probability,
    λ = mean value of the Poisson distribution,
    n = number of events, and
    e = base of natural logarithms.

4. The generator of random variates defined in claim 1 in which said means for comparing determines whether one input value is numerically greater than or equal to another input value.

5. The generator of random variates defined in claim 1 further comprising means for selecting a fixed segment of a fixed multiple of a random number from said source and means for generating a fixed multiple of a random number from said source.

6. The generator of random variates defined in claim 1 further comprising means for offsetting a truncated narrow range of cumulative distribution function values and means for generating a truncated narrow range of cumulative distribution function values.

7. The generator of random variates defined in claim 1 further comprising means for offsetting numerical values at coded addresses by the number of transitional cumulative distribution values chosen for truncation.

8. A method for generating discrete random variates comprising the steps of:
    supplying on demand a random number selected from a uniformly distributed number set;
    forming an address for a first random access memory from a fixed segment of a fixed multiple of said random number;
    addressing said first random access memory with said address, said first memory storing mappings of said addresses into a set of numerical values corresponding to a predetermined discrete probability distribution, each numerical value covering a range of addresses, and coded addresses corresponding to transitional values in said probability distribution;
    reading out the desired random variate directly from said first memory where said address is uncoded;
    addressing a second random access memory where said address is coded, said second memory storing transitional values only of a cumulative distribution function derived from said probability distribution;
    comparing said selected random number with successive transitional cumulative distribution function values from said second memory until the cumulative distribution function value next higher than the selected random number is found; and
    reading out the desired random variate corresponding to said next higher cumulative distribution value as the valid output random variate.

* * * * *